May 30, 1961 J. MAURUSHAT, JR 2,986,610

ALARM AND TEST EQUIPMENT FOR CARRIER SYSTEMS

Filed Jan. 7, 1960

5 Sheets-Sheet 1

INVENTOR
J. MAURUSHAT, JR.
BY Donald M Duft
ATTORNEY

REMOTE TERMINAL ALARM AND TESTING CIRCUITS

INVENTOR
J. MAURUSHAT, JR.
BY Donald M Duft
ATTORNEY

May 30, 1961 J. MAURUSHAT, JR 2,986,610

ALARM AND TEST EQUIPMENT FOR CARRIER SYSTEMS

Filed Jan. 7, 1960

5 Sheets-Sheet 3

INVENTOR
J. MAURUSHAT, JR.
BY Donald M Duft
ATTORNEY

CONTROL TERMINAL ALARM AND TEST CIRCUITS

INVENTOR
J. MAURUSHAT, JR.
BY Donald M Duft
ATTORNEY

INVENTOR
J. MAURUSHAT, JR.
BY Donald M Duft
ATTORNEY

United States Patent Office 2,986,610

Patented May 30, 1961

2,986,610

ALARM AND TEST EQUIPMENT FOR CARRIER SYSTEMS

Joseph Maurushat, Jr., Millburn, N.J., assignor to Bell Telephone Laboratories, Incorporated, New York, N.Y., a corporation of New York Filed Jan. 7, 1960, Ser. No. 1,048

20 Claims. (Cl. 179—175.3)

Figure 1:
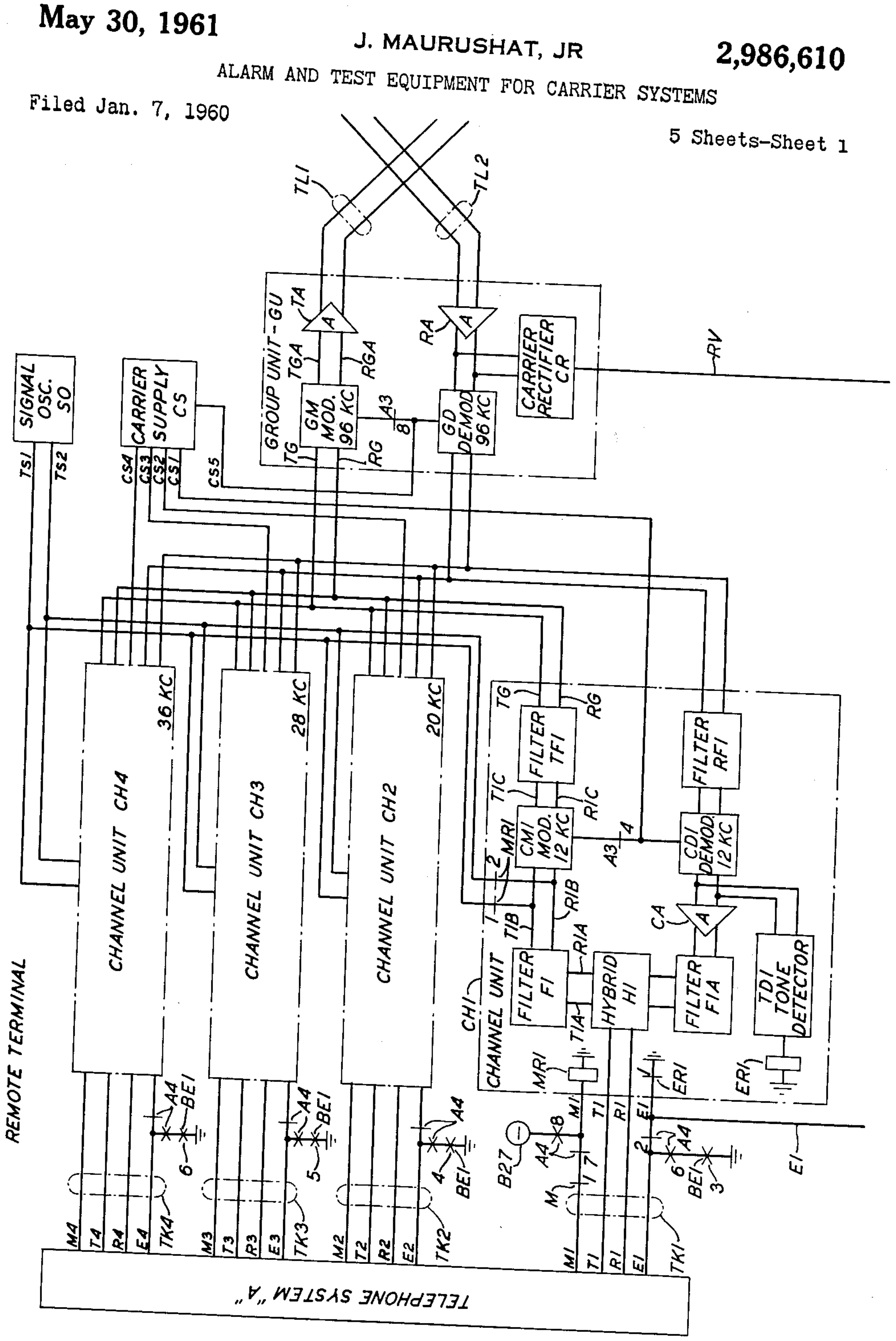

This invention relates to carrier systems and particularly to automatic alarm and test equipment for such systems. This invention further relates to equipment that simplifies the maintenance of carrier systems and minimizes the time carrier circuits are out-of-service due to trouble conditions.

Alarm circuits are customarily used in carrier systems to monitor the signal transmission between terminals of the system. These circuits detect any abnormal transmission condition, which may be caused by the partial or total failure of certain equipment components, and notify the maintenance personnel of the trouble condition. In certain carrier systems, it is an acknowledged practice to have alarm circuits operate to remove carrier equipment from service to prevent improper service conditions after carrier transmission is either temporarily interrupted or seriously impaired. Such alarm circuits are utilized, for example, in the multi-channel carrier systems used for telephone and telegraph communication.

An inherent deficiency in the alarm systems of the prior art is that no means is provided for differentiating between the transmission abnormalities which are classed as transient or self-clearing failures and prolonged failures. Whenever either of these failures occurs, regardless of their duration, many of these alarm circuits function automatically to take the carrier equipments of associated terminals out-of-service until manual tests are conducted to ascertain the condition of the system. Some of these tests are conducted over a special communications channel which is used only for maintenance purposes. In the event that an unattended carrier terminal is involved in the alarm condition, a maintenance attendant is often required to travel to that terminal to either manually restore the carrier equipment or cut-over standby carrier facilities. For transient transmission troubles, it is undesirable to hold equipments out-of-service to perform manual tests since the tests will readily indicate that the carrier system has returned to a condition suitable for service. Obviously, the time consumed in preparing for and conducting these tests, however, rapidly they may be performed, is wasted and increases the outage time of the system unnecessarily. It is therefore desirable to employ alarm and test equipment in carrier systems that functions automatically to distinguish between failures of the aforesaid types and to eliminate the need for any manual testing whenever self-clearing troubles occur, and thereby improve the system efficiency. This is accomplished in a novel manner in accordance with the alarm and test equipment of this invention.

The general object of this invention is to simplify the maintenance of carrier systems and particularly to eliminate any need for maintenance effort on certain types of troubles.

A main object is to minimize the time that carrier equipment is out-of-service due to troubles that affect carrier transmission.

A particular object is to permit carrier equipment to remain in-service whenever self-clearing transmission troubles occur which do not seriously interfere with communication for an extended period.

It is another object to take carrier equipment out-of-service whenever a self-clearing transmission trouble persists for a predetermined period and interferes with proper communication.

It is still another object to perform transmission tests automatically after equipment is taken out-of-service and to notify maintenance personnel of the test progress.

A further object is to distinguish between self-clearing and prolonged transmission troubles which cause equipment to be taken out-of-service, and to allow such equipment to be returned to service only after transmission tests indicate that normal transmission has been re-established.

Other objects of this invention are to improve carrier systems from the standpoints of economy in maintenance and efficiency in operation.

The automatic alarm and test equipment of this invention uses several new circuit arrangements and techniques for carrier system maintenance which differ substantially from earlier arrangements. A unique feature of these new circuit arrangements is a circuit which monitors the level of received carrier signals and distinguishes between abnormally high and low carrier signal levels.

Another feature is the timing means which is included in the alarm facilities for distinguishing between self-clearing transmission troubles that do not seriously interfere with communication and those types of troubles that do. If a failure is of the first mentioned type, the timing means and the aforementioned monitor circuit cooperate to permit equipment to remain in-service. An alarm condition is initiated by the timing means to cause equipment to be taken out-of-service only after a trouble occurs which seriously interferes with communication for a prescribed interval determined by the timing means.

A particular feature of this invention is the automatic test equipment. It includes means for disconnecting traffic from the carrier system after an alarm condition is ascertained; delay means for subsequently making carrier circuits busy to traffic; control means for directing automatic transmission tests; means for notifying the maintenance personnel of the test progress; and means for either restoring carrier circuits to service when a trouble clears itself or locking the circuits out-of-service until the trouble condition is corrected.

An advantage of this invention is that the afore-mentioned objects are attained without the use of the special standby communication or order wire circuit usually used in carrier systems for test and maintenance purposes.

It is also an advantage of this invention that the efforts of maintenance personnel are not required in connection with self-clearing transmission troubles.

The foregoing objects, features and advantages of this invention, as well as others, will be apparent from the subsequent description of an exemplary embodiment thereof shown in the drawings.

A clear and complete understanding of the invention will be obtained by considering a system embodying the invention as represented in the six figures of the drawings. The invention is not, however, to be considered in any way limited in its application to the particular system illustrated in the drawings for it is generally applicable to any carrier system. The figures of the drawings represent in block and schematic form the control and remote terminals of a two-way multichannel carrier system for telephone use which embodies the invention. Four carrier channels of 8 kilocycle (kc.) bandwidth each are utilized. The transmission of telephone voice and supervisory signals in each channel is by the conventional double sideband technique.

Figure 2:
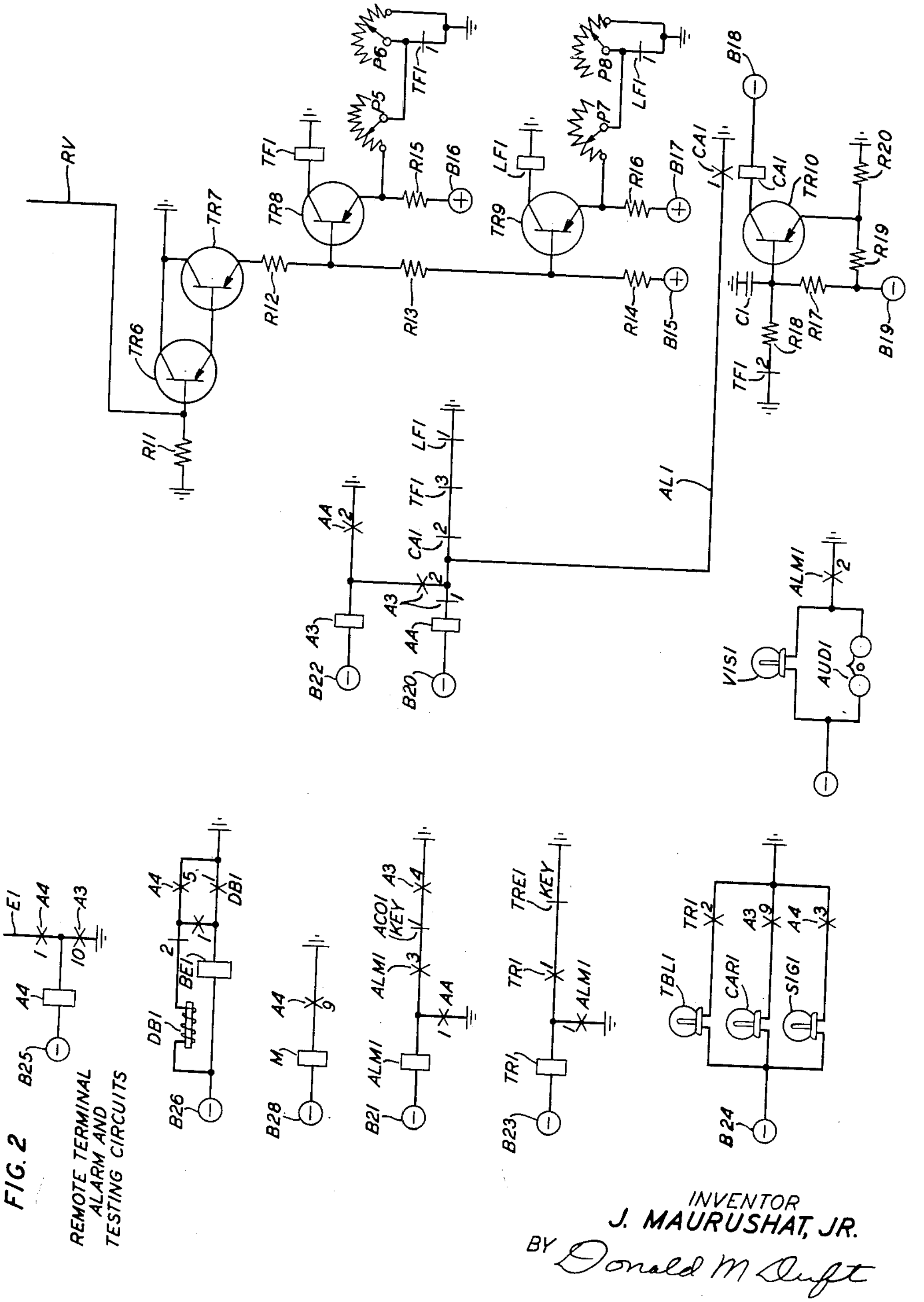
Figure 3:
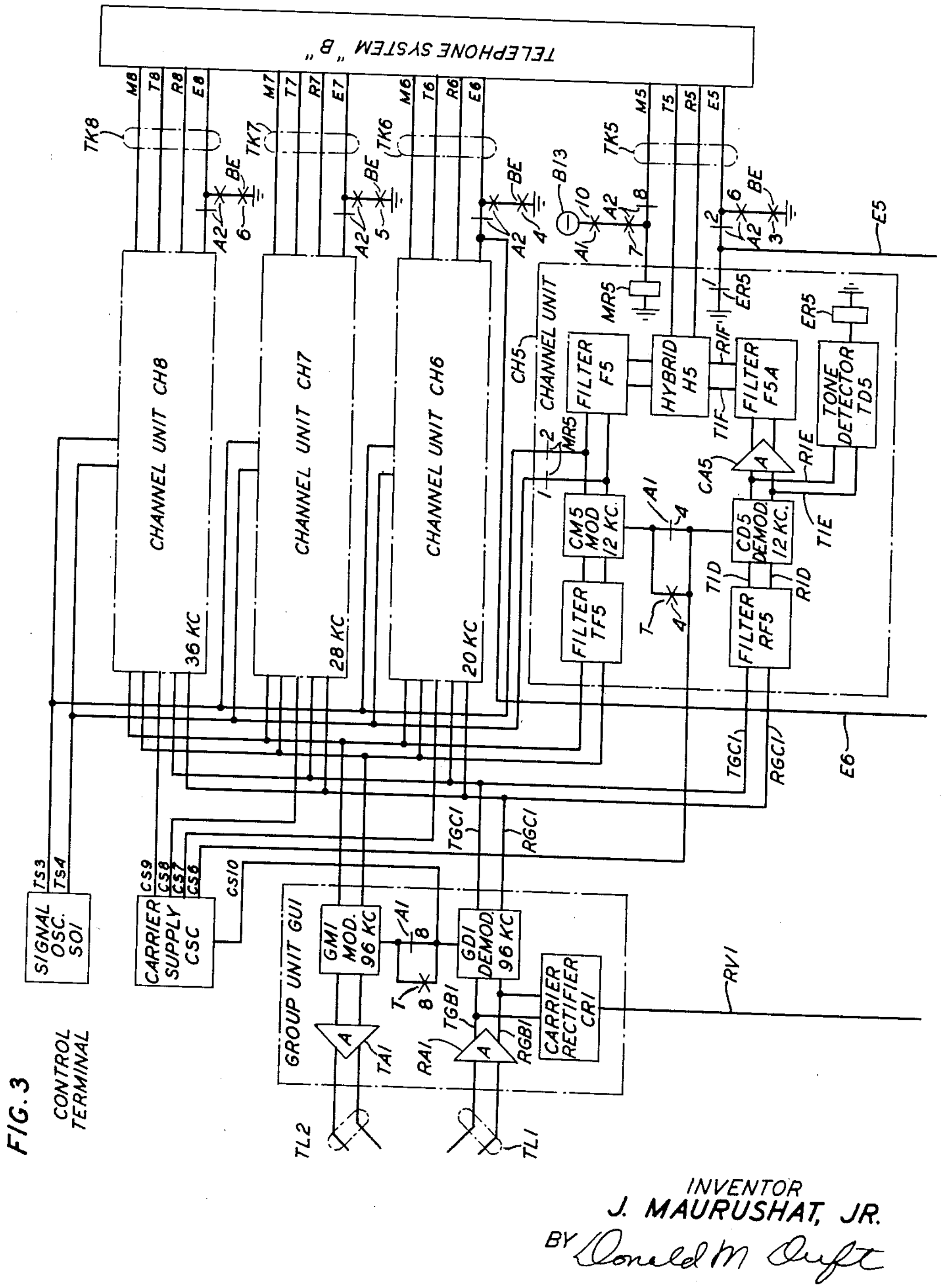
Figure 4:
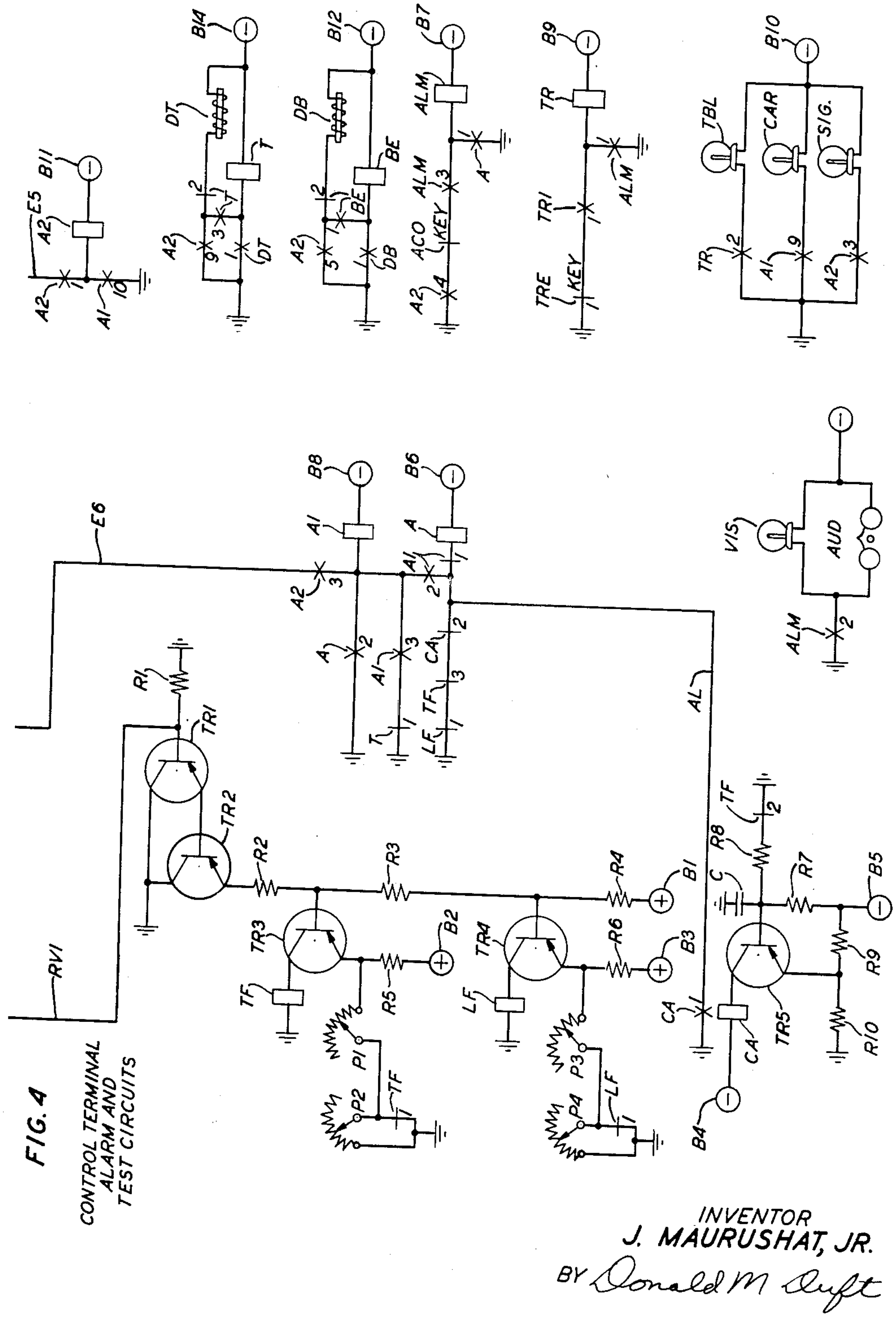
Figure 5:
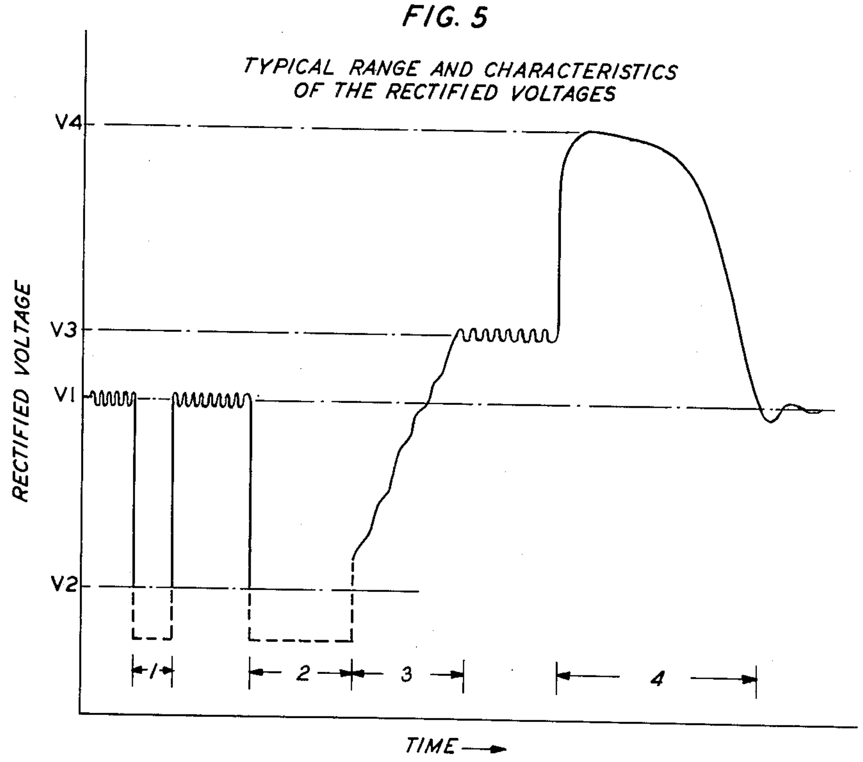
Figure 6:
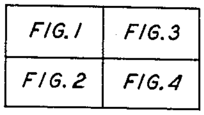

Referring to the drawings:

Fig. 1 illustrates in block and schematic form part of the remote terminal equipment. It shows the telephone system A associated with the carrier system over a number of 4-wire trunks TK1–4. It also shows the channel units CH1–4, the group unit GU, the signal oscillator circuit SO, and the carrier supply circuit CS;

Fig. 2 illustrates in schematic form the alarm and test circuits of the remote terminal;

Figs. 3 and 4 illustrate in block and schematic form the control terminal equipment. This equipment is for the most part the same as that of the remote terminal as shown in Figs. 1 and 2. Certain differences are, however, found in the alarm and test circuit. These relate to the addition of the DT and T relay circuits and to the deletion of the M relay circuit in Fig. 4;

Fig. 5 illustrates a graph of the typical range and characteristics of the rectified voltages used to control the alarm and test circuits; and Fig. 6 illustrates the relative position in which Figs. 1 through 4 may be placed to show an operative arrangement.

In the accompanying drawings, relay contacts are shown in detached form with "*x*" indicating a make contact and a vertical bar a break contact.

SYSTEM DESCRIPTION

*Transmission of telephone voice and supervisory signals*

The interrelation and functions of the equipment units used in the transmission of voice frequency signals will now be described by reference to Figs. 1 and 3. These figures are block diagrams of part of the control and remote terminals. The various circuits of these units are shown in block diagram form because each one is well known in the art. For example, the signal oscillator circuit SO of Fig. 1 may be similar to the RC type oscillator disclosed in the United States Patent 2,268,872 issued January 6, 1942 to W. R. Hewlett, and the hybrid circuit H1 of Fig. 1 may be any of the different versions of the 4-wire terminating sets, such as the inductive or resistive types. For this reason, a description of the various circuits will be of a general nature and only those details necessary for a clear and complete understanding of the instant invention will be presented.

In the example presently to be described, the transmission telephone voice and supervisory signals from telephone system A, over channel 1 to carrier system, to the telephone system B will be explained. In Fig. 1, the telephone system A is connected to channel 1 of a carrier system over the trunk TK1. The leads T1 and R1 of the trunk TK1 are used for voice transmission and the leads E1 and M1 of the trunk TK1 are used for supervisory signaling. The trunk TK1 terminates in the channel unit CH1 of the carrier system. Telephone voice signals from the telephone system A are coupled over leads T1 and R1 of the trunk TK1 and enter the unit CH1 at the hybrid circuit H1. The latter circuit has the function of providing a transistion from a two-wire to a four-wire path and vice versa for carrying voice signals between the telephone system A and the carrier system. From the hybrid H1, transmitted voice signals pass over the leads T1A and R1A through the low pass filter F1 to the channel modulator CM1 over the leads T1B and R1B. The filter F1 defines a voice frequency band between .3 kc. and 3 k.c.

Before proceeding further with the description of transmission telephone voice signals through the channel unit CH1, it is appropriate to explain the characteristics of the signal oscillator circuit SO and the carrier supply circuit CS of Fig. 1. The circuit SO is operative continuously and supplies the 2.6 kc. tone signals to the channel units CH1–4 over the leads TS1 and TS2. Regarding channel unit CH1, this tone current is coupled from the leads TS1 and TS2 through the contacts 1 and 2 of the relay MR1 over leads T1B and R1B to the channel modulator CM1. In order to transmit supervisory signals (dial pulses and the like) in the various on-off combinations, the operation of relay MR1 is controlled via the lead M1 of the trunk TK1. Whenever battery potential is applied to lead M1 for this purpose, relay MR1 is operated and its contacts 1 and 2 disconnect the tone signal from the modulator CM1. In this manner local direct-current signaling is translated to a form that the carrier system handles just as if it were a telephone voice signal.

All of the channel and the group carrier frequency signals required for the remote terminal operation are supplied from the carrier supply circuit CS of Fig. 1. Connections of the channel and group modulator and demodulator circuits to the proper carrier signals are made by the leads CS1–5, inclusive. The carrier frequency allocation of each channel is shown in the modulator CM1 and demodulator CD1 for channel unit CH1 and in the over-all block diagrams of the channel units CH2–4. Circuit CS generates 12, 20, 28, and 36 k.c. carrier signals for the channel units and 96 kc. carrier signals for the group unit. The particular circuit used to derive these signals can employ any of a number of precision oscillators such as a crystal controlled oscillator.

Returning now to the previous description concerning the transmission of signals, it may now be recalled that both the .3 to 3 kc. telephone voice signals and the 2.6 kc. tone signals may be applied to the modulator CM1 over the leads T1B and R1B. When they are, these signals modulate the 12 kc. carrier supplied to the modulator CM1 from the circuit CS. The modulation product signals of the modulator CM1 include the upper and lower sideband frequencies as well as the carrier frequency. These signals are coupled from the modulator CM1 over leads T1C and R1C to the bandpass filter TF1 which suppresses the lower sideband and carrier frequency signals and passes the upper sideband signals over the leads TG and RG to the group unit GU. These signals enter the group unit at the group modulator circuit GM and may be combined with the other signals from the channel units CH2–4 to form frequency multiplex signals. The latter signals then modulate the 96 kc. carrier to shift the signals to the line transmission frequencies. The modulated signals are coupled from the modulator GM to the transmit amplifier circuit TA over the leads TGA and RGA. The amplifier TA then performs common amplification of the signals and delivers them to the line TL1 for transmission to the control terminal.

The signals sent from the remote terminal over the transmission line TL1 enter the control terminal (Fig. 3) at the receive amplifier circuit RA1 of the group unit GU1. The latter circuit serves to amplify the level of the received signal and to automatically compensate for changes in the received signal level. The circuit RA1 includes the conventional feedback regulator which automatically compensates for changes in the received signal level with time. For example, as the received signal level decreases, the gain of the amplifier RA1 is automatically increased to compensate for the change. Likewise, when the signal level increases, the gain of the amplifier RA1 is automatically decreased. The manner in which the gain is regulated is further explained hereinafter in connection with the circuit operations involved in the presence of the trouble condition. The amplified signals from the amplifier RA1 are coupled in parallel to the group carrier rectifier circuit CR1 and to the group demodulator GD1 over the leads TGB1 and RGB1.

Among the received signals amplified by the circuit RA1 and passed over the leads TGB1 and RGB1 to the circuit CR1 are the received 96 kc. group carrier frequency signals. The latter circuit, in a conventional manner, is arranged to select, rectify, and filter the 96 kc. signals. The resultant filtered, or positive direct-current (D.C.), voltages are used to control the circuits of Fig. 4 over the lead RV1. The magnitude of the D.C. voltages is representative of the received 96 kc. carrier signal level. The different values thereof available on the lead RV1 under normal and abnormal conditions are described hereinafter in greater detail.

The group demodulator GD1 converts the received signals to the individual channel frequencies and then passes the signals to the respective channel units CH5–8. From the demodulator GD1, received signals of channel 1 are coupled to bandpass filter RF5 over the leads TGC1 and RGC1 and thence to the channel demodulator CD5 over the leads T1D and R1D. After demodulation by the demodulator CD5, telephone voice signals pass over the leads T1E and R1E through the channel amplifier CA5, low pass filter F5A, over the leads T1F and R1F, and through receive portion of the hybrid H5 to the telephone system B via the leads T5 and R5 of the trunk TK5.

The tone frequencies of the demodulated signals which may appear on the leads T1E and R1E are detected, rectified, and amplified by the tone detector circuit TD5 and are used to control the signaling relay ER5. When tone signals of sufficient amplitude and duration are detected on the leads T1E and R1E, the circuit TD5 responds and operates the relay ER5. When they are not, relay ER5 is released. The operated or released condition of relay ER5 conveys supervisory signals to the telephone system B. Whenever relay ER5 is operated, its contact 1 removes ground potential from the lead E5 of the trunk TK5. When it is released, ground potential is applied to the lead E5 to operate direct-current signal receiving equipment (not shown) in the telephone system B.

This completes a description of transmission of telephone voice and supervisory signals from the telephone system A over channel 1 of the carrier system to the telephone system B. The transmission of such signals in the other direction or over the other channels 2 to 4, inclusive, of the carrier system is accomplished in essentially the same manner as described above.

*Alarm and test circuits*

The alarm and test facilities of Figs. 2 and 4 include circuits which monitor the rectified carrier (96 kc.) voltage produced by the carrier rectifier circuits CR and CR1 of Figs. 1 and 3, respectively. Each of the monitor circuits provides for detecting irregularities in the rectified voltage which indicate failures that interfere with proper telephone service. A failure is detected when the rectified voltage applied to a monitor circuit deviates from predetermined minimum and maximum levels as shown in the graph of Fig. 5 by the values V2 and V3, respectively.

A monitor circuit provides a positive alarm for the failure of certain equipment units of the carrier system which are common to the four communication channels, as well as for the failure of the transmission facilities. A timing circuit is included in the alarm facilities to distinguish between a temporary and a long term failure. The timing circuit cooperates with a monitoring circuit and permits the carrier system to remain in service if a temporary failure occurs. An alarm is indicated and equipment is taken out-of-service only when a long term failure occurs.

After equipment is taken out-of-service and transmission is interrupted, a positive increase in the rectified voltage may be produced by noise, crosstalk, or singing which is of such a magnitude as to no longer indicate a failure. However, a monitor circuit is arranged to distinguish between these changes and to activate alarms in the presence of a long term failure. The alarm facilities provide visual and audible alarm indications by lamps and bells. An alarm condition will result in the actuation of relay circuits which interrupt all transmissions between the two terminals. In addition, these actuated relay circuits provide disconnect and subsequent make-busy signals on the signaling leads of all trunks after the carrier system failure. The relay circuits also control a sequence of automatic transmission tests in order to ascertain whether a trouble clears automatically and whether the system can be returned to service. If a trouble persists, the carrier system is held out-of-service, the alarms remain activated and the trunks between the carrier system and the telephone systems A and B are held busy. On the other hand, if the transmission tests indicate that the trouble is cleared, the carrier system and the trunks are returned to service and the alarms are deactivated.

A. *Normal transmission*

This section describes the monitor circuit of the alarm and test facilities of Fig. 4, and the manner in which the circuit cooperates with the carrier rectifier circuit CR1 of Fig. 3 when the carrier system is operating properly. The other functions of these facilities in detecting trouble conditions, removing circuits from service, testing, retiring alarms, and automatically restoring circuits to service are covered in the following section B.

As mentioned hereinbefore, 96 kc. carrier frequency signals are received over the transmission line TL1, are amplified by the receive amplifier circuit RA1 of Fig. 3 and are converted into D.C. voltages by the carrier rectifier circuit CR1 of Fig. 3. The nominal value of the positive D.C. voltage applied by the circuit CR1 to the lead RV1 at this time is illustrated in the graph of Fig. 5 by the designation V1. The typical range and characteristics of the voltages which may be applied to lead RV1 under the various other operating states of the system are also illustrated in the graph of Fig. 5. These voltages V2–4, and their order of occurrence, will be explained in the section B.

The D.C. voltage coupled from the circuit CR1 over the lead RV1 is applied to the junction of the resistor R1 and the base electrode of the transistor TR1. The transistors TR1 and TR2 form part of an emitter-follower circuit which functions as a buffer amplifier circuit between the rectifier circuit CR1 and the amplifier circuits which include the transistors TR3 and TR4. The circuit arrangement of the emitter-follower circuit is conventional. It uses the cascaded form of the transistors TR1 and TR2 to obtain a high current gain and the voltage divider comprising resistors R2, R3, and R4 as part of the load for developing appropriate bias voltages for the transistors TR3 and TR4.

Fixed bias for the transistors TR1 and TR2 is obtained from the ground potential applied to the base electrode of transistor TR1 through resistor R1 and from the positive battery potential B1 applied to the emitter electrode of transistor TR2 through resistors R4, R3, and R2. The collector electrodes of transistors TR1 and TR2 are both connected directly to ground potential. The emitter-to-base junctions of the transistors TR1 and TR2 are normally forward biased to set the operating region of the circuit. The path of the bias current is mainly from the battery B1 through the resistors R4, R3, and R2, the emitter-to-base resistances of transistors TR1 and TR2, and resistor R1 to ground potential. The magnitude of the base bias current of transistor TR1 is small relative to the magnitude of the input current produced by the D.C. voltages from the rectifier circuit CR1 to drive the emitter-follower circuit. As a result, therefore, the bias current has a negligible loading effect on the circuit CR1. The voltage at the emitter electrode of transistor TR2 follows, in the well known manner, the voltage applied to the lead RV1 and also proportional voltage changes are developed across the resistors R2, R3, and R4 to control the operation of the transistors TR3 and TR4.

The D.C. amplifier circuit used to control the temporary failure relay TF comprises the transistor TR3 and its associated circuitry. Transistor TR3 is used in a common-emitter configuration and is biased normally in a high impedance cutoff state. The base electrode bias is supplied from the voltage divider resistors R2, R3, and R4 of the emitter-follower circuit. The emitter bias is derived from a circuit extending from battery B2 through resistor R5, potentiometer P1, and contact 1 of relay TF to ground potential. The adjustable arm of the potentiometer P1 is preadjusted to bias the transistor TR3 in the cutoff state when, as hereinbefore mentioned, the voltage V1 (Fig. 5) is applied to the lead RV1, and as a result thereof, a fixed bias potential is applied to the base electrode of transistor TR3. The collector electrode of transistor TR3 is connected in series with the winding of relay TF to ground potential.

The operation of the long term failure relay LF is controlled by the D.C. amplifier circuit which includes the transistor TR4 and its associated circuitry. Transistor TR4 is biased normally in the low impedance conduction state. The initial forward bias for the emitter-to-base circuit is controlled from the circuit including battery B3, resistor R6, potentiometer P3, and the contact 1 of the relay LF. The potentiometer P3 is preadjusted to forward bias the transistor TR4 when the voltage V1 (Fig. 5) is applied to the lead RV1. The collector current flowing as a result of regular transistor action through the winding of relay LF operates relay LF. The operated contact 1 of relay LF inserts the resistance of potentiometer P4 into the emitter circuit of transistor TR4 to change the fixed emitter bias. The additional resistance increases the steady state collector current and holds relay LF operated.

These circuit conditions prevail in the control terminal alarm and test circuits during the time of normal transmission. The state of the corresponding circuits (Fig. 2) of the remote terminal is essentially the same as described above.

B. *Transmission failure*

A number of trouble conditions such as the total or partial failure of a transmit or receive amplifier circuit, or a carrier rectifier circuit, or certain other equipment common to the four communication channels at either the control or the remote terminal can cause further operations of the alarm and test circuits. In the following example, it is assumed that a power failure occurs at the remote terminal which interrupts transmission to the control terminal. It is also assumed that the receiving circuits of the remote terminal are functioning properly, and that channel 1 of the carrier system is being used for telephone communication at the time of the failure.

When transmission is interrupted at the remote terminal, it is recognized at the control terminal by an excessive decrease in the D.C. voltage applied to the lead RV1 to control the emitter-follower circuit of Fig. 4. This decrease in voltage is caused by the loss of the 96 kc. carrier signal. Whenever the voltage applied to the lead RV1 by the carrier rectifier circuit CR1 of Fig. 3 decreases to or below the nominal value V2 (Fig. 5), the emitter-follower circuit operates and decreases, toward ground potential, the voltages applied to the base electrodes of the transistors TR3 and TR4. This increases the emitter-to-base current of transistor TR4 and holds relay TF operated. It also causes an emitter-to-base current to flow in the transistor TR3 and results in a corresponding emitter-to-collector current flow by the well known transistor action. The collector current flows through the winding of the relay TF and operates the relay. The relay TF operates its contact 1 and inserts the resistance of the potentiometer P2 into the emitter circuit of the transistor TR3. It also operates its contact 2 to start the operation of the timing circuit of Fig. 4 comprising transistor TR5. Further operations of the direct-current amplifier circuits of Fig. 4 will be discussed after a short description of the transistor timing circuit.

The timing circuit of Fig. 4 is used to generate a timed interval against which the period of a transmission failure may be measured. The circuit includes the transistor TR5 whose operation is controlled by a resistor-capacitor network. The transistor TR5 is biased normally at cutoff. The emitter bias is derived from the circuit extending from battery B5 through resistors R9 and R10 to ground potential. When relay TF is released, the base electrode reverse bias is supplied from battery B5 and the voltage divider comprising resistors R7 and R8. Under these conditions, the potential developed across the timing capacitor C is very small. The collector electrode of the transistor is connected in series with the winding of the carrier alarm relay CA to battery B4. Returning now to the previous description, it may be recalled that, when the TF relay is operated, contact 2 of relay TF is operated to start the operation of the timing circuit. When the latter occurs, the timing capacitor C charges from battery B5 through resistor R7 and the capacitor C to ground potential. The charging current through resistor R7 produces a voltage which initially is in opposition to forward biasing the emitter-to-base junction of the transistor TR5. As a result, transistor TR5 cannot conduct until the charging current decays to such an extent where the charging current produces a voltage across the capacitor C, and at the base electrode, which is more negative than the emitter bias voltage. Thereupon the emitter-to-base circuit is forward biased and institutes conduction therein. Collector current is then drawn from battery B4 through the winding of relay CA, the collector-to-emitter resistance, and resistor R10 to ground potential, and causes relay CA to operate and thereby close its contact 1. The closure of contact 1 applies ground potential to the carrier alarm lead AL to start, as described in subsequent paragraphs, the operation of other circuits of Fig. 4. The relay TF may, as described below, be released either prior to the completion of the timing operation in the presence of a temporary failure, or subsequent thereto when a long term failure occurs. After the relay TF is released, its contact 2 closes a path for stopping the timing operation, if it is not already completed; for discharging the timing capacitor C; for reestablishing the above mentioned bias conditions for the transistor TR5; and for causing the release of relay CA, if it had been previously operated. The discharge path for capacitor C extends from ground potential through the contact 1 of relay TF, resistor R7, and the capacitor C to ground potential.

When the power failure at the remote terminal is self-clearing and results in only a temporary interruption of transmission which does not seriously affect telephone service, the following circuit operations occur after normal transmission is restored. The receive amplifier circuit RA1 and the carrier rectifier circuit CR1 operate to cause the voltage on the lead RV1 to change from the value of or below V2 to V1 as shown by the interval designated 1 in the graph of Fig. 5. The change in voltage is then amplified by the emitter-follower circuit and applied to the base electrodes of the transistors TR3 and TR4 to re-establish the hereinabove described initial bias conditions for the latter transistors. Thereupon the transistor TR3 is cut off and relay TF is released. When relay TF releases, it thereby recloses the hereinabove described path through its contact 1 for re-establishing the initial emitter bias condition for transistor TR3 for stopping the timing operation and for recycling the associated timing circut.

On the other hand, however, when the power failure causes a transmission interruption which interferes with proper telephone communication for an extended period, the following operations occur. The timing circuit of Fig. 4 continues the timing operation for a prescribed interval under control of relay TF, and then, as hereinabove discussed, permits transistor TR5 to conduct and operate the relay CA. Upon the operation of relay CA, ground potential is extended through the operated contact 1 of relay CA over the alarm lead AL, contact 1 of relay A1, and the winding of relay A to battery B6 to operate relay A. Relay A operates and closes paths for operating the relays ALM and A1. The path for operating relay ALM is from ground potential through the contact 1 of relay A and the winding of relay ALM to battery B7. The operate path for relay A1 extends from ground potential through contact 2 of relay A and the winding of relay A1 to battery B8.

The operation of relay ALM closes paths for operating the trouble record relay TR and for activating the audible and visual alarms AUD and VIS. The operate path for relay TR is from ground potential through contact 1 of relay ALM and the winding of relay TR to battery B9. Upon operating, relay TR locks operated through its contact 1 and contact 1 of the trouble record erase key TRE to ground potential. Relay TR then remains operated until the key TRE is manually operated. Relay TR also closes a path for energizing the trouble lamp TBL; this path being from ground potential through contact 2 of relay TR and the resistance of the lamp TBL to battery B10. The audible and visual alarms AUD and VIS of Fig. 4 are activated under control of the contact 2 of relay ALM. The audible and visual alarms alert the maintenance personnel of the alarm condition and the lamp TBL indicates the particular equipment affected. No effort is required of the maintenance personnel at this time because the automatic transmission tests will momentarily be started.

Upon the operation of relay A1, primary and secondary paths are closed for locking relay A1 operated. The primary path is from ground potential through contact 1 of relay T, contact 3 of relay A1, and the winding of relay A1 to battery B8. The secondary path is from ground potential through contact 1 of relay CA and contact 2 of relay A1 to the winding of relay A1. When relay A1 operates, its contacts 4 to 8 inclusive (contacts 5–7 of channel units CH6–8 are not shown) are operated to open the leads CS6–10 between the carrier supply circuits CSC and the channel and group modulator circuits. This disconnects the various carrier frequency signals from the latter circuits and interrupts transmission from the control terminal to the remote terminal. This, as hereinafter discussed, causes the operation of the alarm and test circuits at the remote terminal. The operation of relay A1 also gives an indication of the circuit progress and of the disconnection of the various carrier frequency signals by energizing the carrier lamp CAR. The circuit for controlling this lamp CAR is from ground potential through contact 9 of relay A1 and the resistance of lamp CAR to battery B10.

The operation of relay A1 also closes a path for operating the relay A2 of Fig. 4. This path is from ground potential through contact 10 of relay A1 and the winding of relay A2 to battery B11. Relay A2 operates and then locks operated under control of the ground potential supplied through contact 1 of relay ER5 in the channel unit CH5 over the lead E5 of the trunk TK5, and contact 1 of relay A2 to the winding of relay A2. Relay ER5 and the relays ER6–8 (not shown) of the channel units CH6–8 are released at this time because the 2.6 kc. tone signals which drive the tone detector circuits TD5–8 are absent due to the transmission failure. When relay A2 operates, it opens the leads E5–8 of the trunks TK5–8 between the telephone system B and the carrier system. The lead E5 of the trunk TK5 is opened at contact 2 of relay A2 to signal the equipment (not shown) of the telephone system B to disconnect circuits between the telephone user and trunk TK5. Alternate telephone service for that telephone user is then provided for in the well known manner. Subsequently, as hereinafter described, all of the trunks TK5–8 will be made busy. When relay A2 is operated, it closes a path for energizing the signal lamp SIG to give an indication of the progress of the alarm and test circuit operation. This path is from ground potential through contact 3 of relay A2 and the resistance of the lamp SIG to battery B10. The operation of relay A2 also closed a tertiary locking path for relay A1. This path is from ground potential through the contact (not shown) of relay ER6 (not shown) of channel unit CH6, over the lead E6, contact 3 of relay A2, and the winding of relay A1 to battery B8.

Relay A of Fig. 3 releases when its operate circuit is opened at contact 1 of relay A1 upon the operation of relay A1. Relay A, however, is a slow release relay and remains operated long enough for relay A1 to lock operated, as hereinabove described, and for relay ALM to be locked operated as follows: the locking path for relay ALM is from ground potential through the contact 4 of relay A2, contact 1 of the alarm cutoff key ACO, contact 3 of relay ALM, and the winding of relay ALM to battery B7. Relay ALM then remains operated until either the key ACO is manually operated or the relay A2 is released, as hereinafter described, following a successful transmission test.

An operate path is closed for delay busy relay DB upon the above-described operation of relay A2. This path extends from ground potential through contact 5 of relay A2, contact 1 of relay BE, and the winding of relay DB to the battery B12. Relay DB is a slow acting relay which controls the application of a busy signal to the leads E5–8 of the trunks TK5–8 after the equipment (not shown) of the telephone system B is disconnected from these trunks. After an appropriate delay, the relay BE of Fig. 4 is operated under control of relay DB. The relay BE operates in a path which extends from ground potential through the contact 1 of relay DB and the widing of relay BE to battery B12. Upon operating, relay BE locks operated through its contact 1 to ground potential supplied through contact 5 of relay A2. It also opens the operating circuit for relay DB at its contact 2 and causes the release of relay DB. Ground potential is applied to the leads E5–8 of the trunks TK5–8 as shown in Fig. 3 by means of the contacts 3–6 of relay BE to make the trunks TK5–8 appear busy at the telephone system B. For example, ground potential is applied to the lead E5 of trunk TK5 via contact 3 of relay BE and contact 6 of relay A2.

When relay A2 operates, it also closes a path over the lead M5 of trunk TK5 for operating the relay MR5 of the channel unit CH5. This path is from battery B13 through contact 10 of relay A1, contact 7 of relay A2, and the winding of relay MR5 to ground potential. The relay MR5 operates and thereby opens its contacts 1 and 2 to disconnect the 2.6 kc. tone signals from the associated channel modulator CM5. Upon operating, relay A2 also opens the lead M5 of the trunk TK5 at its contact 8 to prevent equipment of the telephone system B from operating the relay MR5 prior to the completion of a successful transmission test.

Following the operation of relay A2, as hereinbefore described, a path is closed for operating the delay test relay DT of Fig. 4. This path is from ground potential through contact 9 of relay A2, contact 2 of relay T, and the winding of relay DT to the battery B14. The DT relay is a slow acting device which, as hereinafter described, delays the automatic transmission test until after the equipment at the control and remote terminals has been removed from service.

Turning now to the circuits of the remote terminal of Figs. 1 and 2, the cessation of transmission from the control terminal to the remote terminal over the transmission line TL2 causes the alarm and test circuits to operate to detect the alarm condition. The operations involved in detecting the alarm condition, disconnecting and busying the equipment (not shown) of the telephone system A, and preparing the carrier circuits for the automatic transmission test are essentially the same as the above-described operations of the control terminal equipment. The only aspects of difference between the equipments of the two terminals are the DT and T relay circuits of Fig. 4 which are provided only in the control terminal and the M relay circuit of Fig. 2 which is provided only at the remote terminal. Relay M is operated when relay A4 (which corresponds to relay A2 of Fig. 4) is operated and the path extending from ground potential through contact 9 of relay A4 and the winding of relay M to battery B29 is closed. Upon operating, relay M operates its contact 1 and opens the M1 lead of the trunk TK1. In view of the similar operation of the alarm and test circuits of Figs. 2 and 4, it is now assumed that the remote terminal equipment has been removed from service in essentially the same manner as the control terminal equipment. The condition of the various circuits of the remote terminal at this point may be summarized as follows: The operated relays are TF1, LF1, CA1, A3, A4, BE1, M, MR1, TR1, and ALM1. The released relays are AA, DB1, and ER1–4 and MR2–4. The audible and visual alarms AUD1 and CIS1 are activated, and the lamps TBL1, SIG1, and CAR1 are energized.

Returning now to previous discussion, it will be recalled that following the operation of relay A2 of Fig. 4, a path was closed for operating relay DT. The latter relay is operated after an appropriate delay to close a path for operating relay T of Fig. 4 and thereby to start the automatic transmission test. This path is from ground potential through contact 1 of relay DT and the winding of relay T to battery B14. Relay T operates and locks operated through its contact 3 and contact 9 of relay A2 to ground potential. It also opens the operate path for relay DT at its contact 2 and the relay releases. Upon operating, relay T operates its contacts 4–8 (contacts 5–7 of channel units CH6–8 are not shown) to reclose the leads CS6–10 which connect the carrier supply circuit CSC and to the various channel and group modulator circuits of Fig. 3, and thereby to reapply the carrier frequency signals to the latter circuits. The carrier signals are then processed through the control terminal in a manner as hereinbefore discussed and transmitted over the transmission line TL2 to the remote terminal.

At the remote terminal, the received 96 kc. carrier signals cause the receive amplifier circuit RA of Fig. 1 and the carrier rectifier circuit CR of Fig. 1 to return to normal operation, in a manner as hereinbefore discussed, and in turn to cause the D.C. voltage on the lead RV to rise from the value near V2 to V1 as shown in the graph of Fig. 5. The latter change is approximately as shown in Fig. 5 by the interval designated 1. The change in D.C. voltage is then amplified by the emitter-follower circuit (transistors TR6 and TR7 and associated circuitry) and applied to the base electrodes of the transistors TR8 and TR9 to re-establish the initial base bias conditions for the latter transistors as hereinabove discussed. Thereupon transistor TR8 is cut off and the relay TF1 is released. When relay TF1 releases, it recloses a path from ground potential through its contact 2 and resistor R18 to the base electrode of transistor TR10 of Fig. 2 to re-establish the initial reverse bias condition for the transistor and thereby cuts off the transistor and effects the release of relay CA1 of Fig. 2. The release of relay CA1 opens the locking path for relay A3 of Fig. 2 and causes it to release. This path is from ground potential through contact 1 of relay CA1, contact 2 of relay A3, and the winding of relay A3 to battery B22. The release of relay A3 causes the lamp CAR1 of Fig. 2 to be extinguished, and causes the reclosure of the leads CS1–5 between the carrier supply circuit CS of Fig. 1 and the channel and the group units CH1–4 and GU, respectively. Lamp CAR1 is extinguished when contact 9 of relay A3 is opened. The leads CS1–5 are reclosed upon the closure of contacts 4–8 of relay A3 (contacts 5–7 of channel units CH2–4 are not shown). Under the conditions of the supposititious example, when the leads CS1–5 are reclosed, the various carrier frequency signals are reapplied to the respective channel and group modulator circuits of Fig. 1.

If the assumed power failure persists and continues to interfere with the operation of the transmit portion of the remote terminal carrier equipment, carrier signals are not sent to the control terminal. At the control terminal during this time, the gain of the receive amplifier circuit RA1 of Fig. 3 is being increased automatically under control of the automatic regulator in the same circuit. As this occurs, noise, crosstalk, and other signals which may be present at low levels on the transmission line TL1 are amplified in the circuit RA1 and coupled to the carrier rectifier circuit CR1. The latter selects, rectifies and filters certain components of these amplified signals, which simulate the 96 kc. carrier signal, and causes a positive increase in the D.C. voltage applied over the lead RV1 to the emitter-follower circuit of Fig. 4. The increase in voltage is indicated in the graph of Fig. 5 by the interval designated 3. The positive change in voltage is normally delayed, and occurs a prescribed time interval after the transmission interruption and following the removal of the control and remote terminal equipment from service. As indicated in the graph, the voltage may change from the value near V2 to V3 as the gain of the amplifier circuit RA1 is increased toward maximum. When the voltage level on the lead RV1, in rising towards the value V3, is slightly less positive than the value V1, the associated emitter-follower circuit causes proportional positive voltage changes to be applied to the base electrodes of the transistors TR3 and TR4 as previously explained. The voltage thus applied to the base electrode of transistor TR3 causes the emitter-to-base circuit thereof to become reversed biased to stop conduction in the transistor and in turn causes the release of the relay TF. The release of the relay TF, as hereinabove explained, recloses its contact 2 to recycle the associated timing circuit and thereby to cause the release of relay CA. When relay TF releases, it also recloses its contact 1, which shunts the resistance of potentiometer P2, and re-establishes the initial emitter bias for the transistor TR3. Upon the release of relay CA, the secondary locking path for relay A1 is opened at contact 1 of relay CA; however, relay A1 does not release because it is locked operated to its tertiary locking path. The latter path is from ground potential through the now released contact (not shown) of the relay ER6 (not shown) of the channel unit CH6. This tertiary path thereby serves to guard against the false restoration-to-service of the control terminal equipment due to high level noise and the like signals on the transmission line TL1 and provides for a positive check of actual carrier transmission as hereinafter explained. Following the above-described release of relay CA, the gain of the amplifier circuit RA1 continues to increase, and the voltage on the lead RV1 rises toward V3 in the presence of noise until transmission is re-established. When the voltage V3 is attained and, as previously explained, the emitter-follower circuit operates to apply proportional positive voltage increases to the base electrodes of the transistors TR3 and TR4, transistor TR3 is further reversed biased and the emitter-to-base circuit of the transistor TR4 becomes reversed biased. The latter stops conduction in the transistor TR4 and thereby causes the release of relay LF. The release of relay LF closes a fourth locking path for relay A1. This path is from ground potential through contact 1 of relay LF, contact 3 of relay TF, contact 2 of relay CA, contact 2 of relay A1, and the winding of relay A1 to battery B8. Upon the release of relay LF, its contact 1 recloses to shunt the resistance of potentiometer P4 and thereby re-establish the fixed emitter bias for transistor TR4. Following the latter operations, the circuits of the control and remote terminals remain in the above-described condition until transmission over the transmission line TL1 is restored.

Signal transmission over the line TL1 from the remote terminal is restored after the power failure is corrected.

The latter may be self-correcting or may be corrected by the transfer from the in-trouble power equipment (not indicated) to auxiliary power equipment (not shown). Following the resumption of transmission, the 96 kc. signals received at the control terminal are amplified by the circuit RA1, converted into D.C. voltages by the rectifier circuit CR1, and applied to the emitter-follower circuit of Fig. 4 over the lead RV1. The D.C. voltages thus produced and the other circuit operations that may subsequently occur depend upon the gain of the amplifier circuit RA1 at the time that transmission is restored.

As explained above, when transmission is interrupted for an extended period, the gain of the amplifier circuit RA1 can be maximum and the D.C. voltage on the lead RV1 can be the value V3 as indicated in the graph of Fig. 5. The restoration of signal transmission in the presence of such a high gain condition usually results in overloading, singing, and other undesirable transmission conditions. To compensate for the latter transmission irregularities, the following operations occur to permit the amplifier circuit RA1 gain to automatically reduce to its prescribed gain for normal transmission before circuits can be restored to service. Following transmission restoration, the combined operations of the circuits RA1 and CR1 cause the D.C. voltage on the lead RV1 to rise rapidly from the value V3 to the more positive value V4 as shown in Fig. 5. The associated emitter-follower circuit, as previously described, in turn amplifies the voltage on the lead RV1 and causes corresponding positive voltage increases to be applied to the base electrodes of the transistors TR3 and TR4. These voltages further reverse bias both transistors TR3 and TR4 and hold the relays TF and LF in the released condition. Thereafter, the gain of the circuit RA1 is automatically reduced, as previously discussed, by the automatic regulator of the same circuit until it is stabilized at the prescribed gain for normal transmission. While the latter occurs, the level of the amplified received 96 kc. signals, which drive the circuit CR1, is reduced and in turn the value of the D.C. voltage on the lead RV1 is decreased from V4 to V1 as shown in Fig. 5. When the voltage on the lead RV1 decreases to V1, corresponding changes, hereinabove explained, are reflected in the emitter-follower circuit to cause transistor TR4 to conduct and thereby reoperate relay LF. Upon reoperating, relay LF reopens the aforementioned fourth locking path for relay A1 at its contact 1. Further operations of the circuit of relay A1 are hereinafter discussed.

In the case where signal transmission is restored over the line TL1 shortly after the equipments of the control and remote terminals have been removed from service, the gain of the amplifier circuit RA1 is relatively unchanged from the prescribed gain for normal transmission. Hence, as previously described, the circuit actions of the circuits RA1 and CR1 under these conditions cause the D.C. voltage on the lead RV1 to change from the value near V2 to V1 as shown in Fig. 5 in the interval 1. Thereupon, circuit operations, also hereinabove explained, occur to cause the release of relay TF which was previously operated when the transmission failure occurred. The release action of relay TF, as hereinbefore discussed, recloses contact 2 of relay TF to recycle the associated timing circuit and thereby cause the release of relay CA. It also recloses the contact 1 of relay TF to shunt the resistance of potentiometer P2 and thereby re-establishes the initial emitter bias for transistor TR3. Upon the release of relay CA, the aforementioned secondary locking path for relay A1 is opened at its contact 1. The release action of relay A1 that follows is described hereinafter.

As soon as the power failure is corrected, 2.6 kc. tone signals are transmitted from the remote terminal over channels 2 to 4, inclusive. These signals are processed through the control terminal circuits, in a manner hereinbefore explained, and cause the operation of the relays ER6–8 (not shown) of the channel units CH6–8. Upon operating, these relays operate their respective contacts to cause ground potential to be removed from the leads E6–8 of the trunks TK6–8 in the same manner as when relay ER5 of channel unit CH5 operates its contact 1 to remove ground potential from the lead E5 of trunk TK5. These leads, however, as well as lead E5 of trunk TK5 still have ground potential applied thereto under control of the contacts of relays A1 and A2 to make the trunks TK5–8 appear busy to the telephone system B. The operation of relay ER6 (not shown) opens the hereinbefore described tertiary locking path for relay A1 at its contact 1 (not shown).

Under the conditions hereinabove described, relay A1 releases when the locking path controlling its operation is opened at the contact 1 of either relay CA or relay LF. The release of relay A1 opens the path through the lamp CAR at its contact 9 and the lamp extinguishes to indicate the test progress. Relay A1 also causes the operate path for relay MR5 of the channel unit CH5 to be opened at its contact 10. Thereupon relay MR1 releases and closes its contacts 1 and 2 to cause the 2.6 kc. tone signals to be reapplied to the channel modulator CM5. The latter tone signals are then processed through the control terminal circuits and sent over the transmission line TL2 to the remote terminal in a manner as previously explained.

At the remote terminal, these signals pass through the circuits of the group unit GU and of the channel unit CH1 in a manner also previously discussed and cause the operation of the relay ER1 of Fig. 1. In turn, relay ER1 opens the locking path for relay A4 of Fig. 2 at its contact 1 and thereby causes the release of the relay. The release action of relay A4 causes its contacts to open the locking paths for relays ALM1 and BE1, the operate path for relay MR1 of channel unit CH1, the operate path of slow release relay M of Fig. 2, and the path through the lamp SIG1. The lamp SIG1 extinguishes to indicate the test progress. Relay ALM1 releases and opens its contact 2 to deactivate the audible and visual alarms AUD1 and VIS1 of Fig. 2. Relay BE1 releases and opens its contacts 3–6 to remove the make busy ground potential from the leads E1–4 of the trunks TK1–4. Relay MR1 releases and closes its contacts 1 and 2 to cause the 2.6 kc. tone signals to be reapplied to the channel modulator CM1. These signals are then processed through the remote terminal circuits and sent over the transmission line TL1 to the control terminal. Relay M of Fig. 2 remains operated long enough to permit the circuit operations described in the next paragraph to be completed before reclosing the lead M1 of the trunk TK1 between the carrier system and the telephone system A. Thereafter, the key TRE1 of Fig. 2 may be momentarily operated to open the locking path for relay TR1 at its contact 1 and thereby cause its release. Relay TR1 in turn opens the path through the lamp TBL1 to extinguish the lamp. This completes the restoration of the remote terminal equipment to service.

At the control terminal, the tone signals received over channel 1 of the carrier system cause the relay ER5 of the channel unit CH5 to be operated in a manner previously explained. When relay ER5 operates, it causes the locking path for relay A2 to be opened at its contact 1 and thereby effects the release of the relay. The release action of relay A2 causes its contacts to reclose the lead M5 of the trunk TK5 between the carrier system and the telephone system B and also to open the path through the lamp SIG and the locking paths for the relays ALM, BE, and T. The lamp SIG extinguishes to indicate the test progress. Relay ALM releases and opens its contact 2 to deactivate the audible and visual alarms AUD and VIS of Fig. 4. Relay BE releases and opens its contacts 3–6 to remove the make busy ground potentials from the leads E5–8 of the trunks TK5–8. The key TRE may then be manually operated to cause the release of the relay TR which in turn causes the lamp TBL to be extinguished. This completes the restoration of the carrier system to service.

While the alarm and test circuits of this invention have been described with reference to a particular embodiment in a multichannel carrier system for telephone use, it is to be understood that such an embodiment is intended to be illustrative of the principles of the invention and that numerous other embodiments may be devised by those skilled in the art without departing from the spirit and scope of the invention.

What is claimed is:

1. In a communication system having a first and a second terminal, means for transmitting signal currents from said first terminal to said second terminal, means at said second terminal responsive to the reception of signal currents deviating from predetermined characteristics for effecting the interruption of said signal current transmission, means operative subsequent to said interruption for effecting the transmission of test currents between said terminals, and means responsive to the satisfactory reception of said test currents for restoring said signal current transmission.

2. In a carrier communication system having a first and a second terminal, means for transmitting carrier signals from each terminal in each direction between said terminals, means responsive to the reception of carrier signals deviating from predetermined amplitudes at said first terminal for interrupting the transmission of carrier signals from each terminal, means operative subsequent to said interruption for effecting the transmission of test signals from each terminal, and means responsive to the satisfactory reception of test signals at both terminals for restoring carrier signal transmission from both terminals.

3. In a two-way carrier communication system having a first and a second terminal, means for normally transmitting carrier signals for communication purposes from each of said terminals in both directions between said terminals, means at said first terminal responsive to the reception of said carrier signals deviating from a predetermined range of amplitudes for effecting the interruption of said carrier signal transmission from said first terminal to said second terminal, means at said second terminal responsive to said transmission interruption for effecting the interruption of said carrier signal transmission from said second terminal to said first terminal, means at each of said terminals operable subsequent to said transmission interruptions for effecting test transmissions of carrier signals from each of said terminals, and means at said terminals responsive to the satisfactory reception of said test carrier signals for restoring said normal carrier signal transmission from both terminals.

4. In a two-way carrier communication system having a first and a second terminal, means for normally transmitting carrier signals for communication purposes from each of said terminals in both directions between said terminals, means at said first terminal responsive to the reception of said carrier signals deviating from a predetermined amplitude for effecting the interruption of said carrier signal transmission from said first terminal to said second terminal, means at said second terminal responsive to said transmission interruption for effecting the interruption of said carrier signal transmission from said second terminal to said first terminal, means at said first terminal operable subsequent to said transmission interruptions for effecting the transmission of test carrier signals from said first terminal to said second terminal, means at said second terminal responsive to the satisfactory reception of said test carrier signals for effecting the transmission of test carrier signals from said second terminal to said first terminal, and means at said terminals responsive to the satisfactory reception of said test carrier signals at each terminal for restoring said normal carrier signal transmission from both terminals.

5. In a two-way carrier communication system having a first and a second terminal, means at said terminals for normally transmitting carrier signals for communication purposes in the two directions between said terminals; means at said terminals responsive to the interruption of said carrier signal transmission in any one of said directions for effecting the interruption of said carrier signal transmission in the other direction, means at said first terminal operable subsequent to said last-mentioned interruption for initiating the sequential transmission of test carrier signals from each terminal, and means at said terminals responsive to the satisfactory reception of said test carrier signals for restoring said normal carrier signal transmission from both terminals.

6. In a communication system having a first and a second terminal, means for transmitting carrier signals for communication purposes from said first terminal to said second terminal, means responsive to the reception of carrier signals deviating from a predetermined amplitude at said second terminal for interrupting said transmission of carrier signals, means operable automatically subsequent to said interruption for transmitting test signals from said first terminal to said second terminal, and means responsive to the satisfactory reception of said test signals at said second terminal for restoring said carrier signal transmission between said terminals.

7. In a communication system having a first and a second terminal, means for normally transmitting carrier signals for communication purposes from said first terminal to said second terminal, means responsive to a temporary interruption of said carrier signal transmission due to a transient trouble condition for automatically prolonging said interruption in order to perform automatic tests, means operable automatically subsequent to said transmission interruption to control the transmission of test carrier signals from said first terminal to said second terminal, and means responsive to the satisfactory reception of said test carrier signals at said second terminal for automatically restoring said normal carrier signal transmission.

8. In a communication system having a first and a second terminal, means for normally transmitting carrier signals for communication purposes from said first terminal to said second terminal, means responsive to a temporary interruption of said transmission due to a transient trouble condition for automatically prolonging said interruption, means at each of said terminals responsive to said interruption for indicating an alarm condition, means operable automatically subsequent to said interruption to control the transmission of test carrier signals from said first terminal to said second terminal, means responsive to the satisfactory reception of said test carrier signals at said second terminal for operating said indicating means to cancel said alarm condition, and means controlled by the cancellation of said alarm condition for automatically restoring said normal carrier signal transmission.

9. In a communication system having a first and a second terminal, means for normally transmitting carrier signals for communication purposes from said first terminal to said second terminal, timing means responsive to a temporary interruption of said transmission due to a transient trouble condition for generating a timed interval against which the period of said interruption is measured, means controlled by said timing means when the period of said interruption exceeds said timed interval for automatically prolonging said interruption in order to perform automatic transmission tests, means at each of said terminals controlled by said timing means for indicating an alarm condition, means responsive to said alarm condition for controlling the transmission of test carrier signals from said first terminal to said second terminal, means responsive to the satisfactory reception of said test carrier signals at said second terminal for operating said indicating means to cancel said alarm condition, and means controlled by the cancellation of said alarm condition for automatically restoring said normal carrier signal transmission.

10. In a two-way carrier communication system having a first and a second terminal, means for normally transmitting carrier signals for communication purposes from each of said terminals in each direction between said terminals, a first timing means responsive to a temporary interruption of transmission to said first terminal due to a transient trouble condition for generating a first timed interval against which the period of said interruption is measured, means controlled by said timing means when the period of said interruption exceeds said timed interval for automatically interrupting transmission to said second terminal, a second timing means responsive to said last-mentioned interruption for generating a second timed interval against which the period of said last-mentioned interruption is measured, means controlled by said second timing means when the period of said last-mentioned interruption exceeds said second timed interval for automatically prolonging said transmission interruption to said first terminal in order to perform automatic transmission tests, means at said first terminal operable automatically subsequent to said interruptions to initiate the sequential transmission of test carrier signals from each terminal, and means at said terminals responsive to the satisfactory reception of said test carrier signals at each terminal for automatically restoring said normal carrier signal transmission in each direction.

11. In a carrier communication system having a first and a second terminal, means for normally transmitting carrier signals for communication purposes from said first terminal to said second terminal, means at said second terminal operable to detect the reception of carrier signals deviating from a predetermined amplitude, means controlled by the operation of said detecting means for indicating an alarm condition, means at said first terminal responsive to said alarm condition for interrupting said carrier signal transmission, means at said first terminal controlled by said interrupting means for effecting the transmission of test signals to said second terminal, said detecting means operable to cancel said alarm condition upon the satisfactory reception of said test signals at said second terminal, and means responsive to the cancellation of said alarm condition for restoring said normal carrier signal transmission.

12. In a carrier communication system having a first and a second terminal, means for normally transmitting carrier signals for communication purposes from said first terminal to said second terminal, means at said second terminal operable to detect the reception of carrier signals deviating from a predetermined amplitude, timing means at said second terminal controlled by the operation of said detecting means for generating a timed interval against which the period of signal amplitude deviations is measured, means controlled by said timing means when the period of a signal amplitude deviation exceeds said timed interval for indicating an alarm condition, means at said first terminal responsive to said alarm condition for interrupting said carrier signal transmission, means at said first terminal controlled by said interrupting means for effecting the transmission of test signals to said second terminal, said detecting means operable to cancel said alarm condition upon the satisfactory reception of said test signals at said second terminal, and means responsive to the cancellation of said alarm condition for restoring said normal carrier signal transmission.

13. In a carrier communication system having a first and a second terminal, means for normally transmitting carrier signals for communication purposes from said first terminal to said second terminal, means at said second terminal operable to detect the reception of carrier signals deviating from a predetermined amplitude, means controlled by the operation of said detecting means for indicating an alarm condition, means at said first terminal responsive to said alarm condition for interrupting said carrier signal transmission, means at said first terminal controlled by said interrupting means for effecting the transmission of first test signals to said second terminal, said detecting means operable to cancel said alarm condition upon the satisfactory reception of said first test signals at said second terminal, means at said first terminal responsive to the cancellation of said alarm condition for effecting the transmission of second test signals to said second terminal, and means at said second terminal responsive to the satisfactory reception of said second test signals at said second terminal for restoring said normal carrier signal transmission.

14. In a carrier communication system having a first and a second terminal, means for normally transmitting carrier signals for communication purposes from said first terminal to said second terminal, means at said second terminal operable to detect the reception of carrier signals deviating from a predetermined amplitude, timing means at said second terminal controlled by the operation of said detecting means for generating a timed interval against which the period of signal amplitude deviations is measured, means controlled by said timing means when the period of a signal amplitude deviation exceeds said timed interval for indicating an alarm condition, means at said first terminal responsive to said alarm condition for interrupting said carrier signal transmission, means at said first terminal controlled by said interrupting means for effecting the transmission of first test signals to said second terminal, said detecting means controllable by the satisfactory reception of said first test signals at said second terminal to cancel said alarm condition, means at said first terminal controlled by said detecting means and responsive to the cancellation of said alarm condition for effecting the transmission of second test signals to said second terminal, and means at said second terminal responsive to the satisfactory reception of said second test signals at said second terminal for restoring said normal carrier signal transmission.

15. In a two-way carrier communication system having a first and a second terminal, means for normally transmitting carrier signals for communication purposes from each of said terminals in each direction between said terminals, first means at said terminals operable to detect the reception of carrier signals deviating from a predetermined amplitude, second means controlled by the operation of said first means for indicating an alarm condition, third means responsive to said alarm condition for interrupting said carrier signal transmission from each terminal, fourth means controlled by said interrupting means for effecting the transmission of test carrier signals in each direction between said terminals, said first means operable to cancel said alarm condition upon the satisfactory reception of said test signals at both terminals, and a fifth means responsive to the cancellation of said alarm condition for restoring said normal carrier signal transmission in each direction.

16. In a two-way carrier communication system having a first and a second terminal, means for normally transmitting carrier signals for communication purposes from each of said terminals in each direction between said terminals, first means at said terminals operable to detect the reception of carrier signals deviating from a predetermined amplitude, second means controlled by the operation of said first means for generating a timed interval against which the period of signal amplitude deviations is measured, third means controlled by said second means when the period of a signal amplitude deviation exceeds said timed interval for indicating an alarm condition, fourth means responsive to said alarm condition for interrupting said carrier signal transmission from each terminal, fifth means controlled by said interrupting means for effecting the transmission of test signals in each direction between said terminals, said first means operable to cancel said alarm condition upon the satisfactory reception of test signals at both terminals, and sixth means responsive to the cancellation of said alarm condition for restoring said normal carrier signal transmission in each direction.

17. In a two-way carrier communication system having a first and a second terminal, means for normally transmitting carrier signals for communication purposes from each of said terminals in each direction between said terminals, means at said terminals operable to detect the reception of carrier signals deviating from a predetermined amplitude, means controlled by the operation of said detecting means for indicating an alarm condition, means responsive to said alarm condition for interrupting said carrier signal transmission from each terminal, means controlled by said interrupting means for effecting the transmission of first test signals in each direction between said terminals, said detecting means responsive to the satisfactory reception of said first test signals at both terminals for cancelling said alarm condition, means controlled by the cancellation of said alarm condition for effecting the transmission of second test signals in each direction between said terminals, and means responsive to the satisfactory reception of said second test signals at both terminals for restoring said normal carrier signal transmission in each direction.

18. In a two-way carrier communication system having a first and a second terminal, means for normally transmitting carrier signals for communication purposes from each of said terminals in each direction between said terminals, means at said terminals operable to detect the reception of carrier signals deviating from a predetermined amplitude, means controlled by the operation of said detecting means for generating a timed interval against which the period of signal amplitude deviations is measured, means controlled by said generating means when the period of a signal amplitude deviation exceeds said timed interval for indicating an alarm condition, means responsive to said alarm condition for interrupting said carrier signal transmission from each terminal, means controlled by said interrupting means for effecting the transmission of first test signals in each direction between said terminals, said detecting means operable to cancel said alarm condition upon the satisfactory reception of said first test signals at both terminals, means controlled by the cancellation of said alarm condition for effecting the transmission of second test signals in each direction between said terminals, and means responsive to the satisfactory reception of said second test signals at both terminals for restoring said normal carrier signal transmission in each direction.

19. In a two-way carrier communication system having a first and a second terminal, means at said terminals for transmitting carrier signals in each direction therebetween, means at said terminals operable to detect the reception of carrier signals deviating from a range of predetermined amplitudes, means controlled by the operation of said detecting means for indicating an alarm condition, means responsive to said alarm condition for interrupting said carrier signal transmission from each terminal, and means controlled by said interrupting means for effecting the transmission of test signals from each terminal, said detecting means operable to cancel said alarm condition upon the satisfactory reception of said test signals at both terminals.

20. In a two-way carrier communication system having a first and a second terminal, means at said terminals for normally transmitting carrier signals for communication purposes in each direction between said terminals, first means at said first terminal operable to detect the reception of carrier signals deviating from a predetermined amplitude, second means at said first terminal controlled by the operation of said detecting means for indicating a first alarm condition, third means at said first terminal responsive to said alarm condition for interrupting carrier signal transmission to said second terminal, fourth means at said second terminal operative to detect the interruption of carrier signal transmission thereto, fifth means at said second terminal controlled by the operation of said fourth means for indicating a second alarm condition, sixth means at said second terminal responsive to said second alarm condition for effecting the interruption of carrier signal transmission to said first terminal, seventh means at said first terminal operative automatically subsequent to said last-mentioned interruption to effect the transmission of first test signals to said second terminal, said fourth means being responsive to the satisfactory reception of said first test signals at said second terminal for cancelling said second alarm condition, eighth means at said second terminal responsive to the cancellation of said second alarm condition for effecting the transmission of second test signals to said first terminal, said first means being responsive to the satisfactory reception of said second test signals at said first terminal for cancelling said first alarm condition, ninth means at said first terminal responsive to the cancellation of said first alarm condition for effecting the transmission of third test signals to said second terminal, tenth means at said second terminal responsive to the satisfactory reception of said third test signals at said second terminal for effecting the transmission of fourth test signals to said first terminal, eleventh means at said first terminal responsive to the satisfactory reception of said fourth test signals at said first terminal for restoring said normal carrier signal tranmission to said second terminal, and twelfth means at said second terminal controlled by said tenth means and operative subsequent to said restoration for restoring said normal carrier signal transmission to said first terminal.

References Cited in the file of this patent

UNITED STATES PATENTS 2,673,256 Molnar ---------------- Mar. 23, 1954